US007359543B2

(12) United States Patent
Tsuji et al.

(10) Patent No.: US 7,359,543 B2
(45) Date of Patent: Apr. 15, 2008

(54) IMAGE DETECTOR FOR BANK NOTES

(75) Inventors: Keiji Tsuji, Inba-gun (JP); Toshio Kasai, Gyouda (JP); Tomoyoshi Zenki, Kameoka (JP)

(73) Assignee: Laurel Precision Machines Co., Ltd., Osaka (JP)

( * ) Notice: Subject to any disclaimer, the term of this patent is extended or adjusted under 35 U.S.C. 154(b) by 643 days.

(21) Appl. No.: 10/854,579

(22) Filed: May 25, 2004

(65) Prior Publication Data

US 2004/0240722 A1 Dec. 2, 2004

(30) Foreign Application Priority Data

May 28, 2003 (JP) ............................ 2003-151266

(51) Int. Cl.
*G06K 9/00* (2006.01)

(52) U.S. Cl. ...................... 382/137; 382/193; 194/207

(58) Field of Classification Search ........ 382/101-102, 382/112-114, 135-140, 162, 168, 181, 184, 382/188, 232, 191-198, 255, 260, 274, 275, 382/290-295, 305; 194/207; 235/379; 356/71
See application file for complete search history.

(56) References Cited

U.S. PATENT DOCUMENTS

| | | | |
|---|---|---|---|
| 4,723,072 | A | 2/1988 | Naruse et al. |
| 4,737,649 | A | 4/1988 | Naruse |
| 5,280,333 | A | 1/1994 | Wunderer et al. |

(Continued)

FOREIGN PATENT DOCUMENTS

| | | | |
|---|---|---|---|
| DE | 3500650 | A1 | 7/1985 |

(Continued)

OTHER PUBLICATIONS

Office Action dated Mar. 24, 2006 by Korea patent office.

(Continued)

*Primary Examiner*—Seyed Azarian
(74) *Attorney, Agent, or Firm*—Knobbe Martens Olson & Bear LLP

(57) ABSTRACT

An object is to provide an image detector for bank notes which enables the cost to be lowered. Accordingly this has: a light emitting device 31 (31X) which is arranged facing an image detection sensor 24 (24X), and which irradiates light of a plurality of different wavelengths ranges towards a bank note on a bank note transportation path 12, and detects light of the light which has transmitted through the bank note with an image detection sensor 24 (24X); a light emitting device 27 (27X) which is provided on the same side as the image detection sensor 24 (24X), which irradiates light of a plurality of different wavelengths ranges towards a bank note S, and detects light of the light which is reflected from the bank note with the image detection sensor 24 (24X); an image detection sensor 24 (24Y) provided on the opposite side to the image detection sensor 24 (24X); and a third light emitting device 27 (27Y) provided on the same side as the second image detection sensor 24 (24Y), which irradiates light of a plurality of different wavelength ranges towards the bank note S, and detects light of the light which is reflected from the bank note S with the image detection image detection sensor 24 (24Y).

22 Claims, 10 Drawing Sheets

U.S. PATENT DOCUMENTS

| | | | | |
|---|---|---|---|---|
| 5,576,825 | A | 11/1996 | Nakajima et al. | |
| 5,966,456 | A * | 10/1999 | Jones et al. | 382/135 |
| 6,061,121 | A | 5/2000 | Holl et al. | |
| 6,573,983 | B1 * | 6/2003 | Laskowski | 356/71 |
| 6,734,953 | B2 * | 5/2004 | Numata | 356/71 |
| 6,926,201 | B2 * | 8/2005 | Numata | 235/379 |
| 7,007,788 | B2 * | 3/2006 | Dunlop et al. | 194/207 |
| 7,110,573 | B2 * | 9/2006 | Monk et al. | 382/112 |
| 2003/0031342 | A1 | 2/2003 | Sperl et al. | |
| 2003/0043365 | A1 | 3/2003 | Ross et al. | |
| 2003/0123049 | A1 | 7/2003 | Gerz et al. | |
| 2004/0218802 | A1 | 11/2004 | Suzuki | |

FOREIGN PATENT DOCUMENTS

| | | |
|---|---|---|
| GB | 2379501 A | 3/2003 |
| JP | 60-146386 | 8/1985 |
| JP | 60-146388 | 8/1985 |
| JP | 60-164237 | 8/1985 |
| JP | 60-164886 | 8/1985 |
| JP | 05-199363 | 8/1993 |
| JP | 11-086073 | 3/1999 |
| JP | 2001-357429 | 12/2001 |
| TW | 425531 | 3/2001 |
| WO | WO 01/61654 A | 8/2001 |

OTHER PUBLICATIONS

Notice of Office Action for the U.S. Appl. No. 10/854,578 by USPTO filed on Jul. 6, 2007.

European Search Report by European Patent Office.

* cited by examiner

IMAGE DETECTOR FOR BANK NOTES

RELATED APPLICATIONS

This application is related to, and hereby incorporates by reference, U.S. patent application entitled "IMAGE DETECTOR FOR BANK NOTES", filed on even date herewith and having application Ser. No. 10/854,578.

BACKGROUND OF THE INVENTION

1. Field of the Invention

The present invention relates to an image detector for bank notes which is used when discriminating between bank notes.

2. Description of Related Art

Technology relating to image detectors for bank notes used for example when discriminating the authenticity, denomination and state of wear of bank notes, includes technology in which a light emitting unit arranged on one side of a bank note transportation path irradiates light onto a bank note, and the light transmitted through the bank note is detected by a light receiving unit arranged on the other side of the bank note transportation path, and technology in which light is irradiated onto a bank note from a light emitting section arranged on one side of a transportation path of a light emitting and receiving unit, and the reflected light is detected by a light receiving section of the same light emitting and receiving unit (see Patent document 1, for example). Furthermore, technology relating to image sensor modules used in such image detectors for bank notes has also been disclosed (see Patent document 2, for example).

Patent document 1: Japanese Unexamined Patent Application, First Publication No. Hei 2001-357429

Patent document 2: Japanese Patent No. 3099077

In order to improve the accuracy of discrimination when discriminating the authenticity, denomination and state of wear and the like of bank notes, one method is to discriminate based on the image of one side of the bank note, from either the front or back direction, the image of the reverse side of the bank note, and a front and back transmission image of the bank note, and discriminate based on these images collectively. However, when performing the discrimination in this manner, if the image detector for bank notes disclosed in patent document 1 is used, a first light emitting and receiving unit having a first image detection sensor and a first light emitting device is required for detecting the image on one side in the front and back direction of the bank note, from either the front or back direction, a second light emitting and receiving unit having a second image detection sensor and a second light emitting device is required for detecting the image of the reverse side in the front and back direction of the bank note, and a light emitting unit having a third light emitting device, and a light receiving unit having a third image detection sensor are required for detecting the front and back transmission image of the bank note. Since three image detection sensors are required for the respective light receptions, there is a problem in that cost is increased.

SUMMARY OF THE INVENTION

Accordingly, one aspect of the invention provides an image detector for bank notes which enables the cost to be lowered.

One embodiment comprises: a first image detection sensor; a first light emitting device which is arranged facing the first image detection sensor with a bank note transportation path therebetween, and which irradiates light of a plurality of different wavelengths ranges towards a bank note which is transported on the bank note transportation path, and detects light of the light which has transmitted through the bank note, with the first image detection sensor; a second light emitting device which is provided on the same side of the bank note transportation path as the first image detection sensor, which irradiates light of a plurality of different wavelengths ranges towards a bank note which is transported on the bank note transportation path, and detects light of the light which is reflected from the bank note, with the first image detection sensor; a second image detection sensor provided on an opposite side of the bank note transportation path to the first image detection sensor; and a third light emitting device provided on the same side of the bank note transportation path as the second image detection sensor, which irradiates light of a plurality of different wavelength ranges towards a bank note transported on the bank note transportation path, and detects light of the light which is reflected from the bank note, with a second image detection image detection sensor.

As a result, when light is irradiated by the first light emitting device towards the bank note on the bank note transportation path, the first image detection sensor arranged facing the first light emitting device with a bank note transportation path therebetween, detects the light transmitted through the bank note, namely the front and back transmission image. Furthermore, when the second light emitting device arranged on the same side of the bank note transmission path as the first image detection sensor emits light towards the bank note on the bank note transportation path, the first image detection sensor detects the reflected light, namely the reflection image for one side in the front and back direction. Moreover, when the third light emitting device positioned on the same side of the bank note transportation path as the second image detection sensor which is arranged on the opposite side to the first image detection sensor, irradiates light towards the bank note on the bank note transportation path, the second image detection sensor detects the reflected light, namely the reflection image for the reverse side in the front and back direction. As a result, the image on one side in the front and back direction of the bank note, the image on the other side in the front and back direction of the bank note, and the transmission image for the front and back of the bank note can be detected. Furthermore, since the first light emitting device, the second light emitting device, and the third light emitting device each irradiate light of a plurality of different wavelength regions, then for each of; the image for one side in the front and back direction of the bank note, the image for the reverse side in the front and back direction of the bank note, and the transmission image for the front and back of the bank note, the images for when light of the different wavelength regions is irradiated can be detected. As a result, discrimination accuracy can be increased. Furthermore, for the image detection sensor, just two is sufficient, namely the first image detection sensor and the second image detection sensor.

A second aspect of the invention is that the image detector for bank notes according to the first aspect comprises: a first acquisition control device which emits light of a plurality of different wavelength ranges from the first light emitting device at respective different timings, and emits light of a plurality of different wavelength ranges from the second light emitting device at respective different timings which are also different timings to the first light emitting device, and takes in to a first image memory region, a plurality of image data detected by the first image detection sensor respectively synchronized with the light emissions of the first light emitting device and the second light emitting device; and a second acquisition control device which emits light of a plurality of different wavelength ranges from the third light emitting device at respective different timings, and takes in to a second image memory region, a plurality of image data detected by the second image detection sensor respectively synchronized with the light emissions of the third light emitting device.

As a result, the first acquisition control device emits light of a plurality of different wavelength ranges from the first light emitting device at respective different timings, and emits light of a plurality of different wavelength ranges from the second light emitting device at respective different timings which are also different timings to the first light emitting device, and detects image data by the first image detection sensor respectively synchronized with the light emissions of the first light emitting device and the second light emitting device, and takes in to a first image memory region, a plurality of image data detected by this first image detection sensor. On the other hand, the second acquisition control device emits light of a plurality of different wavelength ranges from the third light emitting device at respective different timings, and detects image data by the second image detection sensor respectively synchronized with the light emissions of the third light emitting device, and takes in to a second image memory region, a plurality of image data detected by the second image detection sensor. Since in this manner, the first acquisition control device is provided for the first image detection sensor, and the second acquisition control device is provided for the second image detection sensor, the detection timing for the image data of the first image detection sensor can be overlapped with the detection timing for the image data of the second image detection sensor. As a result, even more data can be detected for bank notes moving at the same transportation speed.

A third aspect of the invention is that in the image detector for bank notes according to the second aspect, the first acquisition control device and second acquisition control device overlap the detection timing of the image of the first image detection sensor with the detection timing of the image of the second image detection sensor.

Since in this manner, the detection timing for the image data of the first image detection sensor can be overlapped with the detection timing for the image of the second image detection sensor, even more data can be detected for bank notes moving at the same transportation speed.

A fourth aspect of the invention is that the image detector for bank notes according to the first aspect comprises: a single acquisition control device which emits light of a plurality of different wavelength ranges from the first light emitting device at respective different timings, and emits light of a plurality of different wavelength ranges from the second light emitting device at respective different timings which are also different timings to the first light emitting device, and also emits light of a plurality of different wavelength ranges from the third light emitting device at respective different timings which are also different timings to the first light emitting device and the second light emitting device, and takes in to an image memory region, a plurality of image data detected by the first image detection sensor respectively synchronized with the light emissions of the first light emitting device and the second light emitting device, and a plurality of image data detected by the second image detection sensor, respectively synchronized with the light emissions of the third light emitting device.

As a result, the single acquisition control device emits light of a plurality of different wavelength ranges from the first light emitting device at respective different timings, and emits light of a plurality of different wavelength ranges from the second light emitting device at respective different timings which are also different timings to the first light emitting device, and also emits light of a plurality of different wavelength ranges from the third light emitting device at respective different timings which are also different timings to the first light emitting device and the second light emitting device, and takes in to the image memory region, a plurality of image data detected by the first image detection sensor respectively synchronized with the light emissions of the first light emitting device and the second light emitting device, and a plurality of image data detected by the second image detection sensor, respectively synchronized with the light emissions of the third light emitting device. In this manner, one acquisition control device is sufficient for the first image detection sensor and the second image detection sensor.

A fifth aspect of the invention is that in the image detector for bank notes according to any one of the first through fourth aspects, the first light emitting device, the second light emitting device, and the third light emitting device each irradiate light of two different wavelengths regions.

In this manner, because the first light emitting device, the second light emitting device, and the third light emitting device each irradiate light of two different wavelengths regions, discrimination accuracy can be improved.

A sixth aspect of the invention is that in the image detector for bank notes according to the fifth aspect, the first light emitting device, the second light emitting device, and the third light emitting device each irradiate any two lights of visible light, infrared light, and ultraviolet light.

In this manner, because the first light emitting device, the second light emitting device, and the third light emitting device each irradiate any two lights of visible light, infrared light, and ultraviolet light, differences in associated image data can be made conspicuous.

A seventh aspect of the invention is that in the image detector for bank notes according to any one of the first through fourth aspects, the first light emitting device, the second light emitting device, and the third light emitting device each irradiate lights of three different wavelength regions.

Because in this manner, the first light emitting device, the second light emitting device, and the third light emitting device each irradiate lights of three different wavelength regions, discrimination accuracy can be further improved.

An eighth aspect of the invention is an image detector for bank notes according to the seventh aspect, wherein the first light emitting device, the second light emitting device, and the third light emitting device each irradiate visible light, infrared light and ultraviolet light.

Because in this manner, the first light emitting device, the second light emitting device, and the third light emitting device each irradiate visible light, infrared light and ultraviolet light, differences in associated image data can be made conspicuous and comparability can be increased.

DETAILED DESCRIPTION OF THE INVENTION

An image detector for bank notes according to a first embodiment of the present invention is described below with reference to FIG. 1 through FIG. 4.

Figure 1:
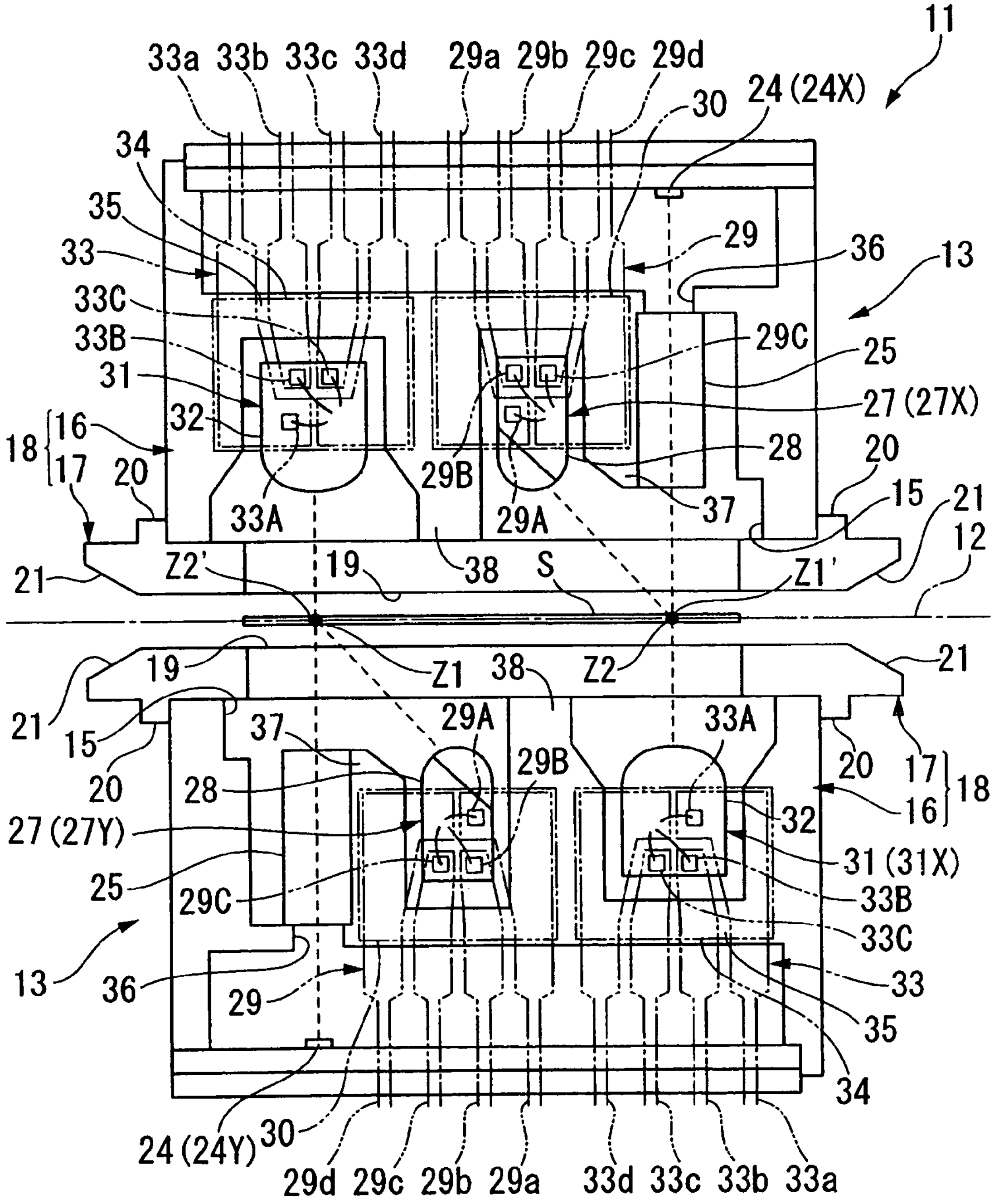
FIG. 1 is an enlarged side cross-sectional view showing an image detector for bank notes according to a first embodiment of the present invention, viewed from one side in the length direction.

As shown in FIG. 1, an image detector for bank notes 11 of the first embodiment comprises a pair of identically constructed detection units 13, arranged so as to oppose each other across a bank note transportation path 12 which transports a bank note S in a straight line.

The dimensions of the detection unit 13 are substantially larger in the length direction (the direction orthogonal to the paper surface in FIG. 1) than in the thickness direction (the vertical direction in FIG. 1) and the width direction (the crosswise direction in FIG. 1), giving the detection unit 13 an elongated shape. The detection unit 13 has a unit main body 18, comprising a housing body 16 in the shape of an elongated box with an opening 15 provided on one side in the thickness direction of the detection unit 13, and a flat elongated translucent cover 17 mounted to the housing body 16 so as to close the opening 15. Because this unit main body 18 forms the outer part of the detection unit 13, its dimensions in the length direction, the thickness direction and the width direction match those of the detection unit 13.

The translucent cover 17 is formed from a transparent material such as glass, and protrusions 20 are formed on the side which is fitted to the housing body 16, at both ends of the translucent cover 17 in the width direction, whereas both ends in the width direction of the surface 19, which represents the opposite side of the translucent cover 17 to the housing body 16, are symmetrical with a mirrored surface, and are formed into beveled sections 21 which narrow towards both ends in the width direction. Positioning of the translucent cover 17 and the housing body 16 is achieved by fitting the housing body 16 inside the portion of the translucent cover 17 enclosed by the protrusions 20.

A CCD sensor (image detection sensor) 24 is provided inside the container main body 18 to one side thereof in the width direction, and on the side opposite to the translucent cover 17. As with the unit main body 18, this CCD sensor 24 is also an elongated shape, and is fitted to the housing body 16 of the unit main body 18 such that the length direction of the CCD sensor 24 matches the length direction of the unit main body 18. The image detection direction of this CCD sensor 24 faces towards the translucent cover 17 along the thickness direction of the unit main body 18. The length of the CCD sensor 24 is longer than that of the longest bank note S that the device is expected to handle.

An elongated fiber lens array (lens body) 25 is provided inside the unit main body 18, towards the front in the detection direction of the CCD sensor 24, that is on the translucent cover 17 side, and in parallel with the CCD sensor 24. This fiber lens array 25 is mounted to the housing body 16 of the unit main body 18 so that the position of the fiber lens array in the width direction and the length direction of the unit main body 18 overlaps the CCD sensor 24 completely. The length of the fiber lens array 25 is also longer than that of the longest bank note S that the device is expected to handle.

Here, the CCD sensor 24 positions the first detection area, which is the detection area for the image captured via the fiber lens array 25, at a point that is located a predetermined distance outside the translucent cover 17 in the detection direction (in FIG. 1, Z1 indicates the first detection area for the lower detection unit 13 and Z1' indicates the first detection area for the upper detection unit 13), and as such, the line that connects this first detection area and the CCD sensor 24 is orthogonal to the surface 19. Obviously, the shape of the first detection area is also elongated in the length direction of the unit main body 18. Consequently, the CCD sensor 24 detects an image of the first detection area located outside the translucent cover 17 on one side of the unit main body 18. Furthermore, the fiber lens array 25 is disposed inside the unit main body 18 between the first detection area and the CCD sensor 24.

An elongated light emitting body 27 that irradiates light diagonally towards the first detection area is provided inside the unit main body 18, and is positioned inward of the fiber lens array 25 in the width direction, and in parallel with the CCD sensor 24 and the fiber lens array 25 (the direction of the light is indicated by the dashed line in FIG. 1). This light emitting body 27 is mounted to the housing body 16 of the unit main body 18 such that the position of the light emitting body overlaps completely with the CCD sensor 24 and the fiber lens array 25 in the length direction of the unit main body 18.

Figure 2:
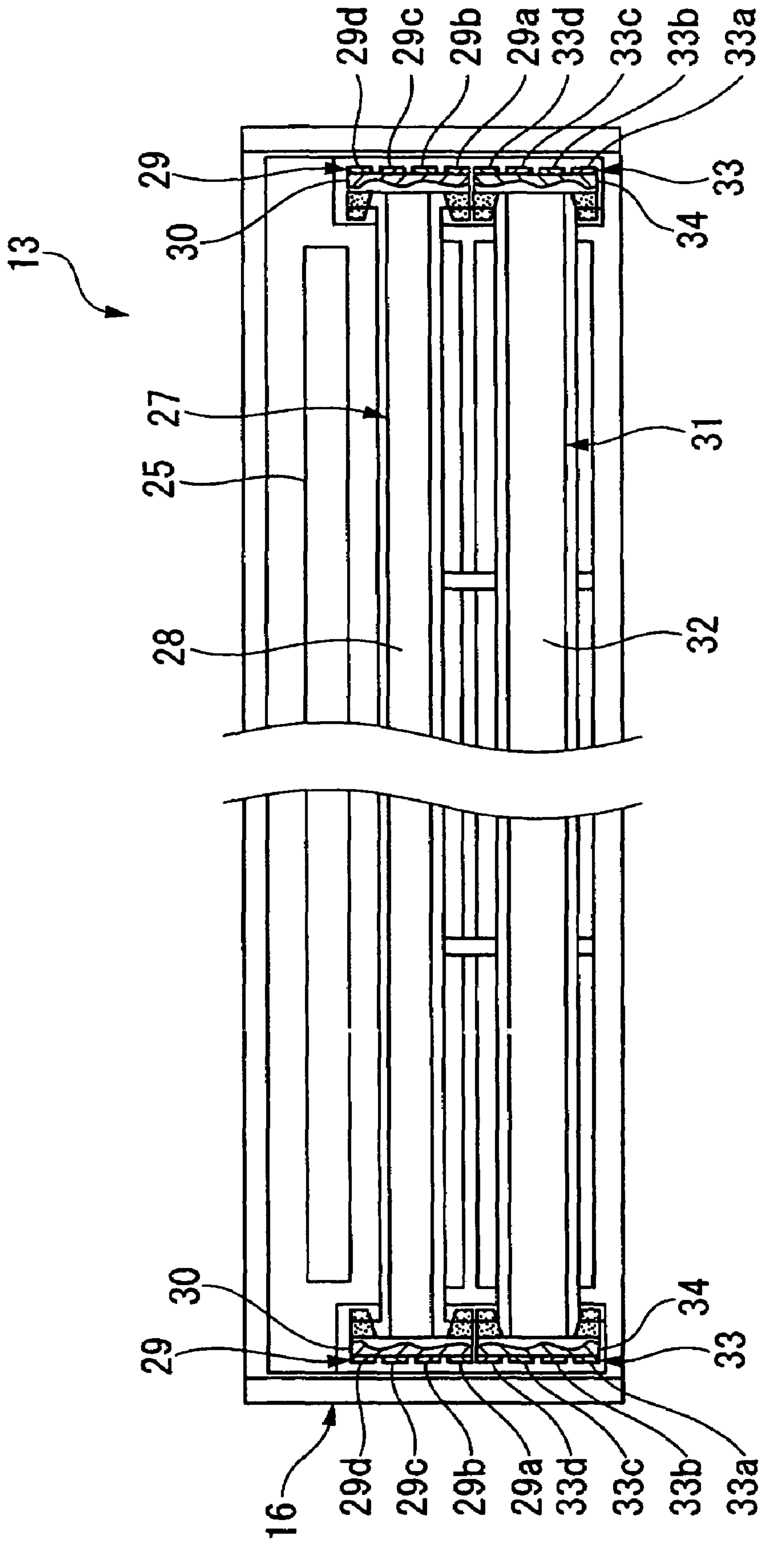
FIG. 2 is a front view showing a detection unit of the image detector for bank notes according to the first embodiment of the present invention, with a translucent cover omitted.

This light emitting body 27 comprises an elongated light guide body 28, made of a transparent material such as glass, which is approximately the same length as, or longer than, the CCD sensor 24 and is arranged in parallel with the CCD sensor 24, and as shown in FIG. 2, also comprises light emitting elements 29 composed of semiconductor elements that are provided on the outer surfaces of a pair of rectangular mounting plates 30, which are formed at both ends of the light guide body 28 in the length direction and extend in a direction orthogonal to this length direction, and these light emitting elements 29 irradiate light into the light guide body 28 from both ends. The length of the light emitting body 27 is also longer than that of the longest bank note S that the device is expected to handle.

Inside the unit main body 18, on the opposite side of the light emitting body 27 from the fiber lens array 25 in the width direction of the unit main body 18, an elongated light emitting body 31 is provided in parallel with the light emitting body 27, the CCD sensor 24 and the fiber lens array 25, and this light emitting body 31 irradiates light directly towards the second detection area, which is set at a different location from the first detection area mentioned above, but is parallel to this first detection area and is the same distance from the translucent cover 17 as the first detection area (in FIG. 1, Z2 indicates the second detection area for the lower detection unit 13, and Z2' indicates the second detection for the upper detection unit 13). This light emitting body 31 is fitted to the housing body 16 of the unit main body 18 such that the position of the light emitting body overlaps completely with the light emitting body 27, the CCD sensor 24 and the fiber lens array 25 in the length direction of the unit main body 18. Furthermore, the light emitting body 31 positions the second detection area at a point that is located a predetermined distance outside the translucent cover 17 along the thickness direction of the unit main body 18, and irradiates light in this direction.

This light emitting body 31 comprises an elongated light guide body 32, made of a transparent material such as glass, which is approximately the same length as, or longer than, the CCD sensor 24 and is arranged in parallel with the CCD sensor 24, and as shown in FIG. 2, also comprises light emitting elements 33 composed of semiconductor elements that are provided on the outer surfaces of a pair of rectangular mounting plates 34, which are formed at both ends of the light guide body 32 in the length direction and extend in a direction orthogonal to this length direction, and these light emitting elements 33 irradiate light into the light guide body 32 from both ends. The length of the light emitting body 31 is also longer than that of the longest bank note S that the device is expected to handle.

Here, the distance from one end of the unit main body 18, namely the first detection area side in the width direction, to the first detection area is equal to the distance from the other end of the unit main body 18, namely the second detection area side in the width direction, to the second detection area.

The light emitting body 27 and the light emitting body 31 are described below in more detail.

In the light emitting body 27, the light emitting elements 29 provided on each end face in the length direction are disposed so as to be able to irradiate light into the light guide body 28 in a plurality of wavelength ranges, specifically three different wavelength ranges, and a plurality of LED elements, specifically three LED elements (light emitting diodes) 29A, 29B and 29C, each being capable of irradiating light independently in a desired wavelength range, are connected to terminal sections 29*a*, 29*b*, 29*c* and to a common electrode terminal 29*d* by wire bonding or the like. With this construction, by choosing one of the terminal sections 29*a* through 29*c* and applying a voltage between that terminal section and the common electrode terminal 29*d*, it is possible to switch between the LED elements 29A through 29C to emit light. By choosing the light emission wavelength of the LED elements 29A through 29C, it is possible to irradiate light in three chosen wavelength ranges, of either visible light of several colors such as RGB, ultraviolet light or infrared light.

Here, in the description of the light emitting elements 29 provided at either end of the light guide body 28, a construction is described in which the LED elements 29A through 29C which coincide in terms of their position on the surface orthogonal to the length direction of the light guide body 28 irradiate light in the same wavelength range. However, it is not essential that these opposing LED elements 29A through 29C irradiate light in the same wavelength range.

Furthermore, it is not essential that the wavelength ranges of the light irradiated by the three LED elements 29A through 29C at one end face and the wavelength ranges of the light irradiated by the three LED elements 29A through 29C at the other end face be a combination of light in three wavelength ranges, and it is possible to emit light from a maximum of six wavelength ranges.

In the light emitting body 31 also, the light emitting elements 33 provided on each end face are disposed so as to be capable of irradiating light into the light guide body 32 in a plurality of wavelength ranges, specifically three different wavelength ranges, and a plurality of LED elements, specifically three LED elements (light emitting diodes) 33A, 33B and 33C, each being capable of irradiating light independently in a desired wavelength range, are connected to terminal sections 33*a*, 33*b*, 33*c* and to a common electrode terminal 33*d* by wire bonding or the like. With this construction, by choosing one of the terminal sections 33*a* through 33*c* and applying a voltage between that terminal section and the common electrode terminal 33*d*, it is possible to switch between the LED elements 33A through 33C to emit light. By choosing the light emission wavelength of the LED elements 33A through 33C, it is possible to irradiate light in three chosen wavelength ranges, of either visible light of several colors such as RGB, ultraviolet light or infrared light.

In the first embodiment, as described later, the light emitting body 27 and the light emitting body 31 each emit light of a plurality of, more specifically only two different wavelength regions. Therefore, in the light emitting body 27, in the case where only two of the three LED elements 29A to 29C emit light, so that light of a certain wavelength region is weak, it is possible to have a plurality of light emissions for that wavelength region of the LED elements 29A to 29C, and one light emission for the remaining wavelength region. Similarly for the light emitting body 31, in the case where only two of the three LED elements 33A to 33C emit light, so that light of a certain wavelength region is weak, it is possible to have a plurality of light emissions for that wavelength region of the LED elements 33A to 33C, and one light emission for the remaining wavelength region.

A bottom wall 35 is formed in the housing body 16 to prevent light inside the housing body 16 from the light emitting body 27 and the light emitting body 31 from leaking into the CCD sensor 24, an opening 36 is formed in this bottom wall 35 only in a position in front of the CCD sensor 24 in the detection direction, and the fiber lens array 25 is fitted so as to cover this opening 36. Furthermore, a side wall 37 which prevents light from the light emitting body 27 and the light emitting body 31 from leaking into the fiber lens array 25, and a side wall 38 which prevents leakage of light between the light emitting body 27 and the light emitting body 31 are also formed in the housing body 16.

On the other hand, the bank note transportation path 12 mentioned above transports the bank note S directly in a straight line, with the length direction of the bank note S orthogonal to the transportation direction, and the width direction parallel to the transportation direction. Therefore in FIG. 1, the length direction of the bank note S is arranged in the direction orthogonal to the paper surface, the width direction of the bank note S is aligned with the crosswise direction of the paper surface, and the bank note S is transported in the crosswise direction across the paper surface, from left to right for example.

Furthermore, the image detector for bank notes 11 comprises the pair of detection units 13, and as described above each of these detection units comprises the CCD sensor 24 which detects an image of the first detection area set up on one side of the unit main body 18, the light emitting body 27 which irradiates light towards the first detection area, and the light emitting body 31 which irradiates light towards the second detection area set up on the same side of the unit main body 18 but in a different location from the first detection area, all disposed within the unit main body 18, and this pair of detection units 13 is arranged so as to oppose one another across the bank note transportation path 12 such that the CCD sensor 24 of one of the detection units 13 can detect an image of the second detection area of the other detection unit 13. At this time, the pair of detection units 13 oppose one other in an arrangement wherein the surface sections 19 of the respective translucent covers 17 are parallel to the bank note transportation path 12.

In other words, one of the detection units 13 is disposed on one side of the bank note transportation path 12 with the translucent cover 17 thereof facing the bank note transportation path 12, and the other detection unit 13 is disposed on the opposite side of the bank note transportation path 12, and is orientated in a state equivalent to a 180° inversion of the first detection unit 13 about an axis along the length direction, with the detection direction of the CCD sensor 24 of the first detection unit 13 aligned with the irradiation direction of light from the light emitting body 31 of the other detection unit 13. In other words, the pair of detection units 13 are disposed so that the CCD sensor 24 of the detection unit 13 in the lower part of FIG. 1 can detect an image of the second detection area Z2' of the detection unit 13 in the upper part of FIG. 1 (that is, the second detection area Z2' overlaps the first detection area Z1), and the CCD sensor 24 of the detection unit 13 in the upper part of FIG. 1 can detect an image of the second detection area Z2 of the detection unit 13 in the lower part of FIG. 1 (that is, the second detection area Z2 overlaps the first detection area Z1').

At this time, the pair of detection units 13 are aligned in the length direction, and in the width direction the detection units 13 are aligned with the bank note transportation direction of the bank note transportation path 12. The position of the pair of detection units 13 relative to the bank note transportation path 12 is set so that the detection units 13 can detect an image of the entire length of each bank note S transported along the bank note transportation path 12 with the width of the note aligned with the transportation direction. In other words, the position of the pair of detection units 13 relative to the bank note transportation path 12 is set so that the entire length direction of the bank note S transported along the bank note transportation path 12 lies within the lengthwise region occupied by the CCD sensor 24, the fiber lens array 25, the light emitting body 27 and the light emitting body 31.

Because as mentioned above, the distance from one end of the unit main body 18, namely the first detection area side in the width direction, to the first detection area is set equal to the distance from the other end of the unit main body 18, namely the second detection area side in the width direction, to the second detection area, the pair of detection units 13 are aligned in the width direction.

As a result of the above, the pair of detection units 13 are disposed such that the CCD sensors 24 thereof are positioned on opposite sides of the bank note transportation path 12 in the bank note transportation direction, and the beveled sections 21, which act as symmetrical guides for guiding the introduction of the bank notes S to be transported along the bank note transportation path 12, are formed at both ends of the translucent cover 17 of each unit main body 18 in the transportation direction, on the bank note transportation path 12 side of each translucent cover 17.

According to such an image detector for bank notes 11, the CCD sensor 24 of one of the pair of detection units 13 which oppose each other across the bank note transportation path 12 detects an image, namely a front and back transmission image, of the second detection area onto which light is irradiated by the light emitting body 31 of the other detection unit 13, by scanning the second detection area in the length direction, and such front and back transmission images are detected at a plurality of timings during transportation of the bank note S.

Furthermore, according to the image detector for bank notes 11, the CCD sensor 24 of one of the pair of detection unit 13 detects an image, namely a reflected image of either the front or the back side, of the first detection area which is irradiated with light by the light emitting body 27 of this detection unit 13, by scanning in the length direction, and such reflected images of one side in the front and back direction are detected at a plurality of timings during transportation of the bank note S.

In addition, according to the image detector for bank notes 11, the CCD sensor 24 of the opposing detection unit 13 detects an image, that is a reflected image of the opposite side in the front and back direction, of the first detection area which is irradiated with light by the light emitting body 27 of this detection unit 13, by scanning in the length direction, and such reflected images of the opposite side in the front and back direction are detected at a plurality of timings during transportation of the bank note S.

Figure 3:
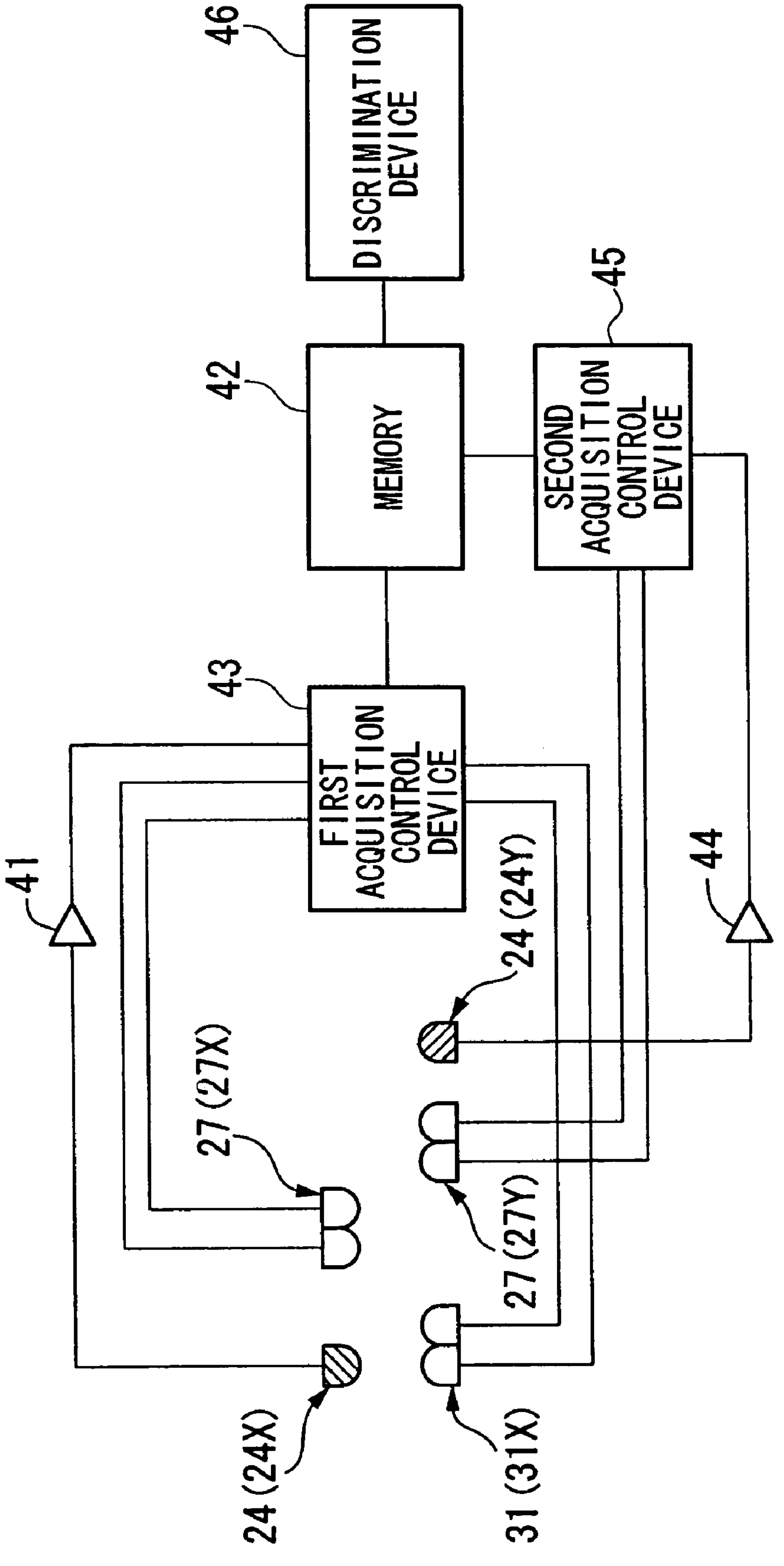
FIG. 3 is a block diagram of a control system illustrating the image detector for bank notes according to the first embodiment of the present invention.

Moreover, the image detector for bank notes 11 has a discrimination device 46 as shown in FIG. 3 which compares the front and back transmission image data, the reflected image data of one side in the front and back direction and the reflected image data of the opposite side in the front and back direction, with master data for example, to distinguish authenticity, denomination and the state of wear and the like.

The pair of detection units 13 are arranged so as to oppose each other across the bank note transportation path 12, with the CCD sensor 24 of the other detection unit 13 also capable of detecting an image of the second detection area of the one detection unit 13. As a result, it is also possible for the CCD sensor 24 of the other detection unit 13 to detect a front and back transmission image of the bank note S. However, because a front and back transmission image consists of overlapping images of the front and back sides of the note, only one CCD sensor 24 need detect the image. Accordingly, detection of a transmission image is not performed by the CCD sensor 24 of the other detection unit 13. As a result, the second light emitting body 31 of the one detection unit 13 is not used.

Here, for example, the light emitting body 31 of the detection unit 13 on the upper side in FIG. 1 is not used. Furthermore, in order to distinguish the CCD sensor 24 of the detection unit 13 on the upper side in the figure serving as the first image detection sensor, this is named the first CCD sensor 24 (24X). Moreover, in order to distinguish the light emitting body 31 of the detection unit 13 on the lower side in the figure serving as the first emitting device which is arranged facing the first CCD sensor 24 (24X) with the bank note transportation path 12 therebetween, and which irradiates light of a plurality, specifically two different wavelengths towards the bank note S which is transported on the bank note transporting path 12, and detects light of the light which has transmitted through the banknote S with the first CCD sensor 24 (24X), this is named the first light emitting body 31 (31X).

Furthermore, in order to distinguish the light emitting body 27 of the detection unit 13 on the upper side in the figure serving as the second emitting device which is provided on the same side of the bank note transportation path 12 as the first CCD sensor 24 (24X), and which irradiates light of a plurality, specifically two different wavelengths towards the bank note S transported on the bank note transporting path 12, and detects reflected light of the light which has reflected from the banknote S with the first CCD sensor 24 (24X), this is named the second light emitting body 27 (27X).

Moreover, in order to distinguish the CCD sensor 24 of the detection unit 13 on the lower side in the figure serving as the second image detection sensor which is provided on the opposite side of the bank note transportation path 12 to the first CCD sensor 24 (24X), this is named the second CCD sensor 24 (24Y). Furthermore, in order to distinguish the light emitting body 27 of the detection unit 13 on the lower side in the figure serving as the third emitting device which is provided on the same side of the bank note transportation path 12 as the second CCD sensor 24 (24Y), and which irradiates light of a plurality, specifically two different wavelengths towards the bank note S transported on the bank note transporting path 12, and detects light of the light which is reflected from the banknote S with the second CCD sensor 24 (24Y), this is named the third light emitting body 27 (27Y).

Moreover, the first embodiment, as shown in FIG. 3, has a first acquisition control device (first acquisition control device) 43, which only emits light of a plurality, specifically two different wavelength ranges from the first light emitting body 31 (31X), at respective different timings, by for example drive of the LED elements 33A and 33B, and also only emits light of a plurality, specifically two different wavelength ranges from the second light emitting body 27 (27X), at respective different timings which are also different timings to the first light emitting body 31 (31X), by for example drive of the LED elements 29A and 29B, and takes in to a first image memory region of a memory 42, a plurality, specifically four image datas detected by the first CCD sensor 24 (24X) at detection timings respectively synchronized with the light emissions of the first light emitting body 31 (31X) and the second light emitting body 27 (27X), and which are AD converted by an AD converter 41.

Furthermore, the first embodiment, has a second acquisition control device (second acquisition control device) 45, which only emits light of a plurality, specifically two different wavelength ranges from the third light emitting body 27 (27Y), at respective different timings, by for example drive of the LED elements 29A and 29B, and takes in to a second image memory region of the memory 42, a plurality, specifically two image datas detected by the second CCD sensor 24 (24Y) at detection timings respectively synchronized with the light emissions of the third light emitting body 27 (27Y, and which are AD converted by an AD converter 44.

The light of the two different wavelength regions emitted by the first light emitting body 31 (31X), the light of the two different wavelength regions emitted by the second light emitting body 27 (27X), and the light of the two different wavelength regions emitted by the third light emitting body 27 (27Y), are any two of one visible light of RGB or the like, ultraviolet light, and infrared light, and all have the same combination. In this case, this is a combination of visible light and infra red light.

Here, the first acquisition control device 43 and the second acquisition control device 45 control the timing so that the detection timing of the image data of the first CCD sensor 24 (24X), is overlapped with the detection timing of all of the images of the second CCD sensor 24 (24Y). That is, since it is not possible to simultaneously detect the plurality of image data of the same CCD sensors, then for the image data detected by the same CCD sensor, the detection timing is made different, and for the image data detected by the different CCD sensors, the detection timing is matched.

Figure 4:
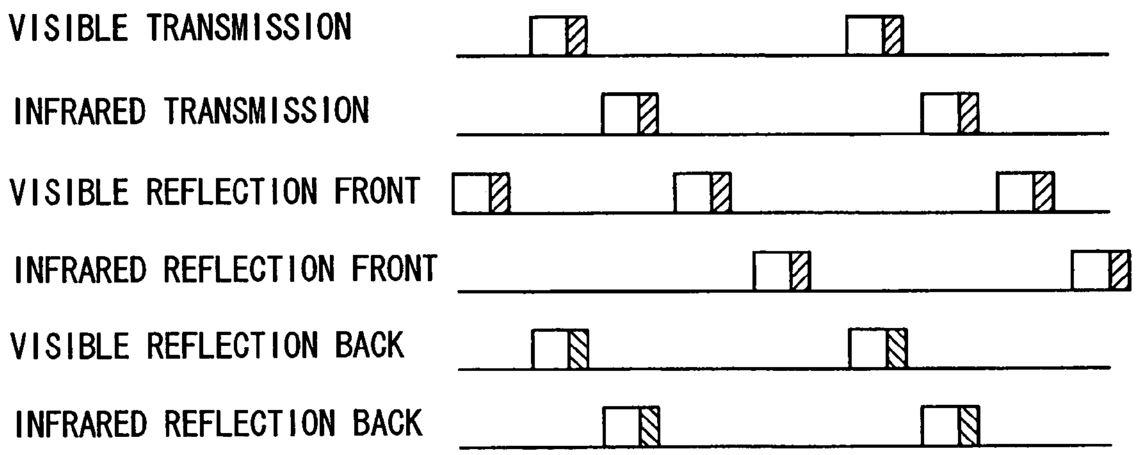
FIG. 4 is a timing chart of light emission and image detection in the image detector for bank notes according to the first embodiment of the present invention.

More specifically, as shown in FIG. 4, (FIG. 4 shows the respective detection timings, the hatched sections being the image detection timing), the first acquisition control device 43, emits light by the first light emitting body 31 (31X), at light emission timings respectively differing for visible light of any one of RGB, and infrared light, and detects the image data by the first CCD sensor 24 (24X) at detection timings respectively synchronized with the light emissions of the first light emitting body 31 (31X) (refer to visible transmission and infrared transmission in FIG. 4).

Furthermore, the first acquisition control device 43, emits light by the second light emitting body 27 (27X), at a light emission timing differing for visible light of any one of RGB, and infrared light, and at a light emission timing differing for the two light emissions of the first light emitting body 31 (31X), and detects the image data by the first CCD sensor 24 (24X) at detection timings respectively synchronized with the light emissions of the second light emitting body 27 (27X) (refer to visible reflection front and infrared reflection front in FIG. 4). Consequently, the transmission image data for the visible light for the front and back of the bank note, the transmission image data for the infrared light for the front and back of the bank note, the reflection image data for the visible light for one side in the front and back direction of the bank note, and the reflection image data for the infrared light for one side in the front and back direction of the bank note, are obtained.

Moreover, the second acquisition control device 45 emits light by the third light emitting body 27 (27Y), at a light emission timing differing for visible light of any one of RGB, and infrared light, and detects the image data by the second CCD sensor 24 (24Y) at detection timings respectively synchronized with the light emissions of the third light emitting body 27 (27Y) (refer to visible reflection back and infrared reflection back in FIG. 4). As a result, the reflection image data for the visible light for the reverse side in the front and back direction of the bank note, and the reflection image data for the infrared light for the reverse side in the front and back direction of the bank note, are obtained. Furthermore, for the reflection image data for the visible light for the reverse side in the front and back direction of the bank note, and the reflection image data for the infrared light for the reverse side in the front and back direction of the bank note, the light emission timings and the detection timings all coincide for the transmission image data for the visible light for the front and back of the bank note, the transmission image data for the infrared light for the front and back of the bank note, the reflection image data for the visible light for one side in the front and back direction of the bank note, and the reflection image data for the infrared light for the one side in the front and back direction of the bank note. In the case where the detection timing of the image data of the first CCD sensor 24 (24X) and the detection timing of the image data of the second CCD sensor 24 (24Y) coincide, then preferably these coincide for the same associated wavelength regions (in FIG. 4 refer to the point where the visible transmission and the visible reflection back have the detection timings coincided, and the point where the infrared transmission and the infrared reflection back have the detection timings coincided).

As described above, according to the image detector for bank notes 11 of the first embodiment, when the light is irradiated towards the bank note S on the bank note transportation path 12 by the first light emitting body 31 (31X), the first CCD sensor 24 (24X) which is arranged facing this on the other side of the bank note transportation path 12 detects the transmission light of the bank note S, namely the transmission image on the front and the back. Furthermore, when the second light emitting body 27 (27X) arranged on the same side of the bank note transportation path 12 as the second CCD sensor 24 (24Y), irradiates light towards the bank note S on the bank note transportation path 12, the reflection light, namely the reflection image from one side in the front and back direction is detected by the first CCD sensor 24 (24X). Moreover, when the third light emitting body 27 (27Y) arranged on the same side of the bank note transportation path 12 as the second CCD sensor 24 (24Y) which is arranged on the opposite side to the first CCD sensor 24 (24X), irradiates light towards the bank note S on the bank note transportation path 12, the reflection light, namely the reflection image from the reverse side in the front and back direction is detected by the second CCD sensor 24 (24Y). As a result, the image on the one side in the front and back direction of the bank note S, the image on the reverse side in the front and back direction of the bank note S, and the transmission image for the front and back of the bank note S can be detected. Moreover, each of the first light emitting body 31 (31X), the second light emitting body 27 (27X), and the third light emitting body 27 (27Y) irradiate light of a plurality, specifically two different wavelength regions. Therefore, light of different wavelength regions for each of; the image on one side in the front and back direction of the bank note S, the image on the reverse side in the front and back direction of the bank note S, and the transmission image for the front and back of the bank note S, can be detected. As a result, discrimination accuracy can be increased. Furthermore, for the image detection sensor just two sensors, namely the first CCD sensor 24 (24X), and the second CCD sensor 24 (24Y), is sufficient. Consequently, the cost can be reduced.

Moreover, the first acquisition control device 43 emits light of a plurality, specifically two different wavelength regions from the first light emitting body 31 (31X) at respective different light emission timings, and emits light of a plurality, specifically two different wavelength regions from the second light emitting body 27 (27X) at respective different light emission timings, and which are also different light emission timings to the first light emitting body 31 (31X), and detects the image data by the first CCD sensor 24 (24X) at detection timings respectively synchronized with the respective light emissions of the first light emitting body 31 (31X) and the second light emitting body 27 (27X), and the plurality, specifically four image datas detected by the first CCD sensor 24 (24X) are taken in to the first image memory region of the memory 42. On the other hand, the second acquisition control device 43 emits light of a plurality, specifically two different wavelength regions from the third light emitting body 27 (27Y) at respective different light emission timings, and detects the image data by the second CCD sensor 24 (24Y) at detection timings respectively synchronized with the respective light emissions of the third light emitting body 27 (27Y), and the plurality, specifically two image datas detected by the second CCD sensor 24 (24Y) are taken in to the second image memory region of the memory 42. In this way, the first acquisition control device 43 is provided for dedicated use for the first CCD sensor 24 (24X), and the second acquisition control device 45 is provided for dedicated use for the second CCD sensor 24 (24Y). Therefore, the detection timing of the image data of the first CCD sensor 24 (24X) can be overlapped with the detection timing of the image of the second CCD sensor 24 (24Y). Consequently, for bank notes moved at the same transmission speed, a larger amount of data can be detected, so that the discrimination accuracy can be further increased.

Furthermore, each of the first light emitting body 31 (31X), the second light emitting body 27 (27X), and the third light emitting body 27 (27Y) irradiate light of two different wavelength regions. Therefore the discrimination accuracy can be improved.

In addition, each of the first light emitting body 31 (31X), the second light emitting body 27 (27X) and the third light emitting body 27 (27Y) irradiate two lights out of visible light, infrared light and ultraviolet light. Therefore differences in associated image data can be made conspicuous. Consequently, discrimination accuracy can be further improved.

In the above, when light is emitted in the respective wavelength ranges, if there is a disparity in the sensitivity on the CCD sensor 24 side, it is possible to minimize this disparity in sensitivity by controlling the irradiation time or the drive current used for the irradiation, for each of the respective wavelength ranges.

Figure 5:
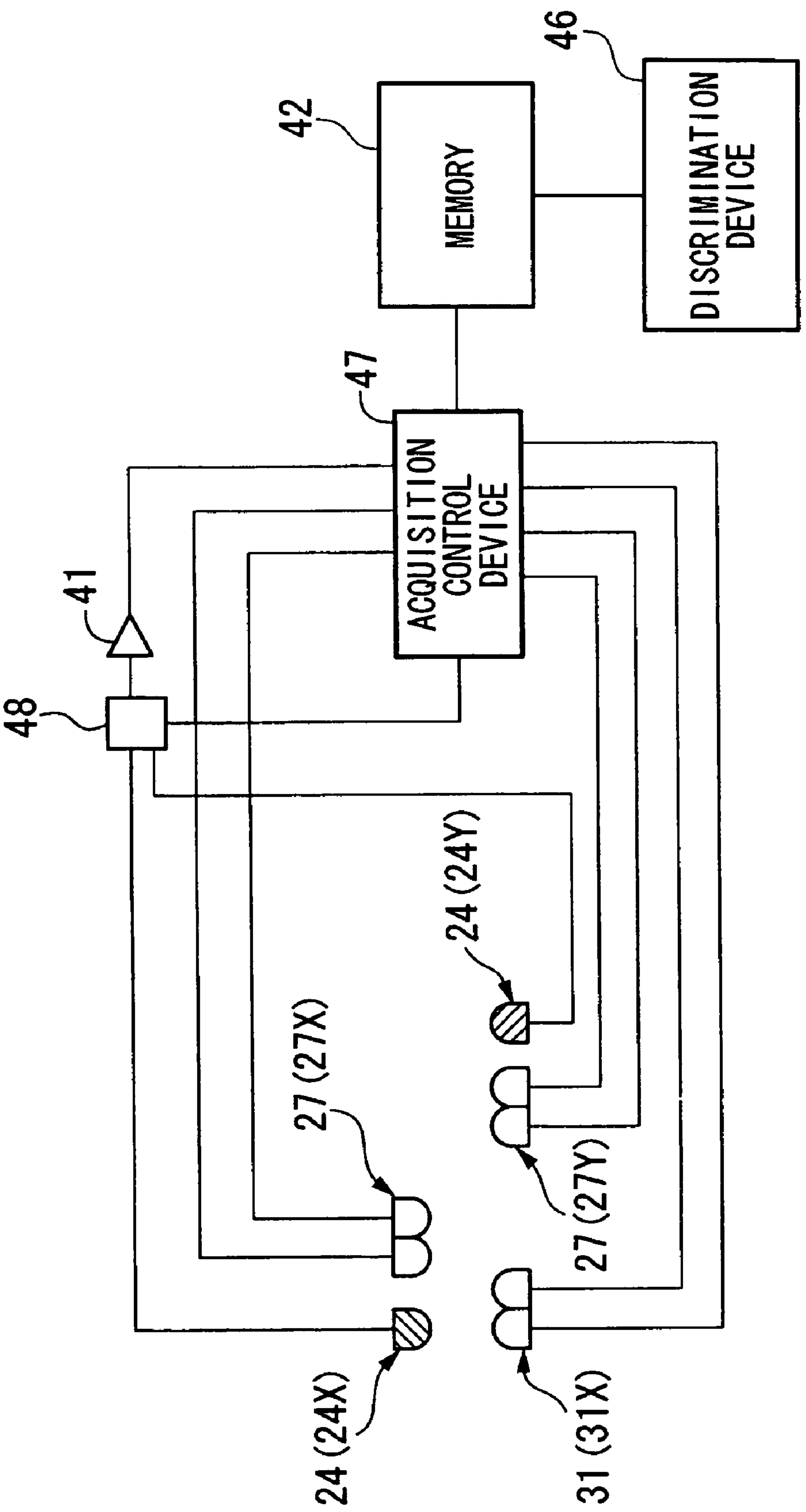
FIG. 5 is a block diagram of a control system illustrating an image detector for bank notes according to a second embodiment of the present invention.
Figure 6:
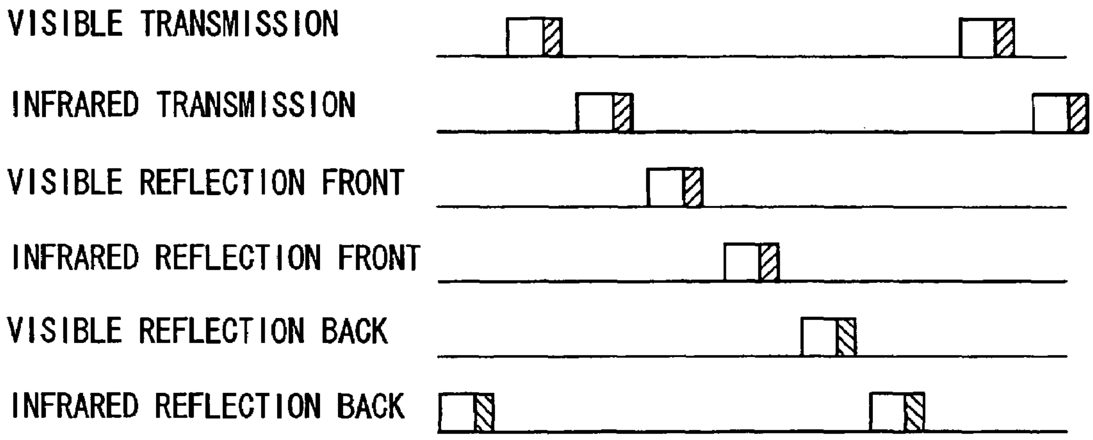
FIG. 6 is a timing chart of light emission and image detection in the image detector for bank notes according to the second embodiment of the present invention.

Next an image detector for bank notes according to a second embodiment of the present invention is described hereunder, with reference to FIG. 5 and FIG. 6, centered on the parts different to the first embodiment. Parts the same as for the first embodiment are denoted by the same reference symbols, and description is omitted.

In the first embodiment, the first acquisition control device 43 and the second acquisition control device 45 are used. However, in the second embodiment, as shown in FIG. 5, a single acquisition control device 47 is used. That is to say, the acquisition control device 47 of the second embodiment, only emits light of a plurality, specifically two different wavelength ranges from the first light emitting body 31 (31X), at respective different light emission timings, by for example drive of the LED elements 33A and 33B, and also only emits light of a plurality, specifically two different wavelength ranges from the second light emitting body 27 (27X), at respective different light emission timings which are also different light emission timings to the first light emitting body 31 (31X), by for example drive of the LED elements 29A and 29B, and also only emits light of a plurality, specifically two different wavelength ranges from the third light emitting device 27 (27Y) at respective different light emission timings which are also different light emission timings to the first light emitting device 31 (31X) and the second light emitting device 27 (27X), by for example drive of the LED elements 29A and 29B.

Together with this, the acquisition control device 47 of the second embodiment, takes in to a first image memory region of a memory 42, a plurality, specifically four image datas detected by the first CCD sensor 24 (24X) at detection timings respectively synchronized with the light emissions of the first light emitting body 31 (31X) and the second light emitting body 27 (27X), and which are AD converted by the AD converter 41 via a multiplexer 48, and also takes in to a second image memory region of the memory 42, a plurality, specifically two image datas detected by the second CCD sensor 24 (24Y) at detection timings respectively synchronized with the light emissions of the third light emitting body 27 (27Y), and which are AD converted by the AD converter 41 via the multiplexer 48.

In this manner, because the acquisition control device 47 is only one, the timing is controlled so that the detection timings of the image data of the first CCD sensor 24 (24X) and the detection timings of the image data of the second CCD sensor 24 (24Y) are all staggered.

More specifically, as shown in FIG. 6, (FIG. 6 shows the respective detection timings, the hatched sections being the image detection timing), the acquisition control device 47, emits light by the first light emitting body 31 (31X), at light emission timings respectively differing for visible light of any one of RGB, and infrared light, and detects the image data by the first CCD sensor 24 (24X) at detection timings respectively synchronized with the light emissions of the first light emitting body 31 (31X) (refer to visible transmission and infrared transmission in FIG. 6).

Furthermore, the acquisition control device 47, emits light by the second light emitting body 27 (27X), at a light emission timing differing for visible light of any one of RGB, and infrared light, and at a light emission timing differing for the two light emissions of the first light emitting body 31 (31X), and detects the image data by the first CCD sensor 24 (24X) at a detection timing respectively synchronized with the light emissions of the second light emitting body 27 (27X) (refer to visible reflection front and infrared reflection front in FIG. 6). Consequently, the transmission image data for the visible light for the front and back of the bank note, the transmission image data for the infrared light for the front and back of the bank note, the reflection image data for the visible light for one side in the front and back direction of the bank note, and the reflection image data for the infrared light for one side in the front and back direction of the bank note, are obtained.

Moreover, the acquisition control device 47 emits light by the third light emitting body 27 (27Y), at a light emission timing differing for visible light of any one of RGB, and infrared light, and also at a light emission timing different to all of the light emissions of the first light emitting body 31 (31X), and the second light emitting body 27 (27X), and detects the image data by the second CCD sensor 24 (24Y) at detection timings respectively synchronized with the light emissions of the third light emitting body 27 (27Y) (refer to visible reflection back and infrared reflection back in FIG. 6). As a result, the reflection image data for the visible light for the reverse side in the front and back direction of the bank note, and the reflection image data for the infrared light for the reverse side in the front and back direction of the bank note, are obtained.

As described above, according to the image detector for bank notes 11 of the second embodiment, the single acquisition control device 47 emits light of a plurality, specifically two different wavelength ranges from the first light emitting body 31 (31X), at respective different light emission timings, and emits light of a plurality, specifically two different wavelength ranges from the second light emitting body 27 (27X), at respective different light emission timings which are also different light emission timings to the first light emitting body 31 (31X), and also emits light of a plurality, specifically two different wavelength ranges from the third light emitting device 27 (27Y) at respective different light emission timings which are also different light emission timings to the first light emitting device 31 (31X) and the second light emitting device 27 (27X), and together with this, takes in to an image memory region, a plurality, specifically four image datas detected by the first CCD sensor 24 (24X) at detection timings respectively synchronized with the light emissions of the first light emitting body 31 (31X) and the second light emitting body 27 (27X), and a plurality, specifically two image datas detected by the second CCD sensor 24 (24Y) at detection timings respectively synchronized with the light emissions of the third light emitting body 27 (27Y). In this manner, one acquisition control device 47 is sufficient for the first CCD sensor 24 (24X) and the second CCD sensor 24 (24Y), and hence cost can be further reduced.

Figure 7:
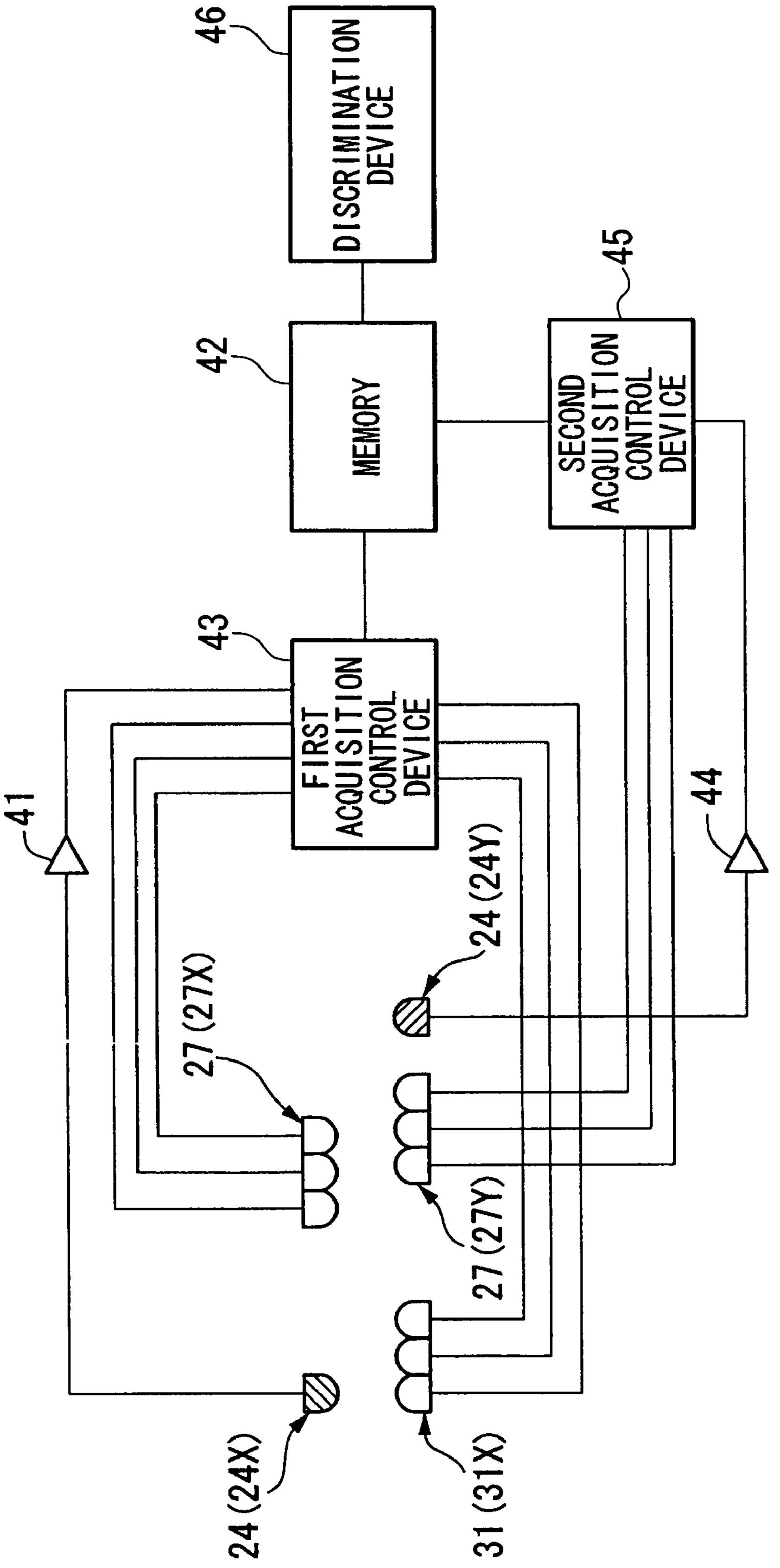
FIG. 7 is a block diagram of a control system illustrating an image detector for bank notes according to a third embodiment of the present invention.
Figure 8:
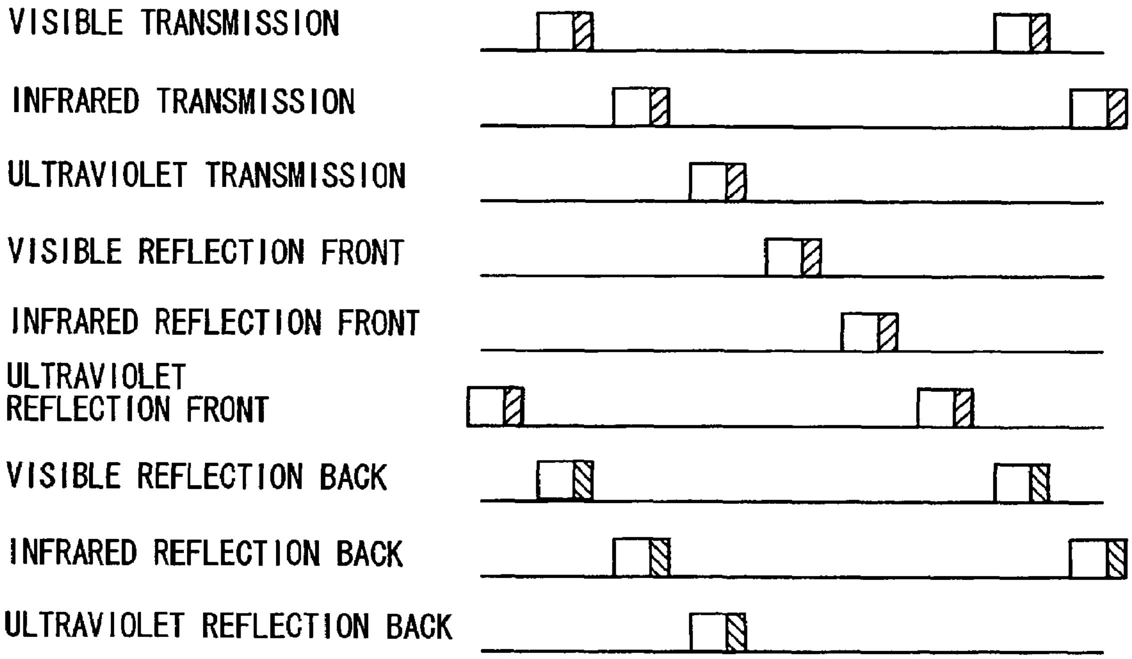
FIG. 8 is a timing chart of light emission and image detection in the image detector for bank notes according to the third embodiment of the present invention.

Next an image detector for bank notes according to a third embodiment of the present invention is described hereunder, with reference to FIG. 7 and FIG. 8, centered on the parts different to the first embodiment. Parts the same as for the first embodiment are denoted by the same reference symbols, and description is omitted.

In the first embodiment, each of the first light emitting body 31 (31X), the second light emitting body 27 (27X), and the third light emitting device 27 (27Y) only emit light of two different wavelength ranges. However, in the third embodiment, these only emit light of three different wavelength ranges.

That is to say, in the third embodiment, as shown in FIG. 7, a first acquisition control device 43 only emits light of three different wavelength ranges from the first light emitting body 31 (31X), at respective different light emission timings, by for example drive of the LED elements 33A, 33B and 33C, and also only emits light of a three different wavelength ranges from the second light emitting body 27 (27X), at respective different light emission timings which are also different light emission timings to the first light emitting body 31 (31X), by for example drive of the LED elements 29A, 29B and 29C, and together with this, takes in to a first image memory region of a memory 42, six image datas detected by the first CCD sensor 24 (24X) at detection timings respectively synchronized with the light emissions of the first light emitting body 31 (31X) and the second light emitting body 27 (27X), and which are AD converted by the AD converter 41.

Furthermore, in the third embodiment, the second acquisition control device 45 only emits light of three different wavelength ranges from the third light emitting body 27 (27Y), at respective different light emission timings, by for example drive of the LED elements 29A, 29B and 29C, and takes in to a second image memory region of the memory 42, three image datas detected by the second CCD sensor 24 (24Y) at detection timings respectively synchronized with the light emissions of the third light emitting body 27 (27Y, and which are AD converted by the AD converter 44. The light of the three different wavelength regions emitted by the first light emitting body 31 (31X), the light of the three different wavelength regions emitted by the second light emitting body 27 (27X), and the light of the three different wavelength regions emitted by the third light emitting body 27 (27Y), are any three of one visible light of RGB or the like, ultraviolet light, and infrared light, and all have the same combination.

Here, the first acquisition control device 43 and the second acquisition control device 45 control the timing so that the detection timing of the image data of the first CCD sensor 24 (24X), is overlapped with the detection timing of all of the images of the second CCD sensor 24 (24Y). That is, in this case also for the image data detected by the different CCD sensors, the detection timing is matched.

More specifically, as shown in FIG. 8, (FIG. 8 shows the respective detection timings, the hatched sections being the image detection timing), the first acquisition control device 43, emits light by the first light emitting body 31 (31X), at light emission timings respectively differing for visible light of any one of RGB, infrared light, and ultraviolet light, and detects the image data by the first CCD sensor 24 (24X) at detection timings respectively synchronized with the light emissions of the first light emitting body 31 (31X) (refer to visible transmission, infrared transmission and ultraviolet transmission in FIG. 8).

Furthermore, the first acquisition control device 43, emits light by the second light emitting body 27 (27X), at a light emission timing differing for visible light of any one of RGB, infrared light, and ultraviolet light, and at a light emission timing differing for all the light emissions of the first light emitting body 31 (31X), and detects the image data by the first CCD sensor 24 (24X) at detection timings respectively synchronized with the light emissions of the second light emitting body 27 (27X) (refer to visible reflection front, infrared reflection front, and ultraviolet reflection front in FIG. 8). Consequently, the transmission image data for the visible light for the front and back of the bank note, the transmission image data for the infrared light for the front and back of the bank note, the transmission image data for the ultraviolet light for the front and back of the bank note, the reflection image data for the visible light for one side in the front and back direction of the bank note, the reflection image data for the infrared light for one side in the front and back direction of the bank note, and the reflection image data for the ultraviolet light for one side in the front and back direction of the bank note, are obtained.

On the other hand, the second acquisition control device 45 emits light by the third light emitting body 27 (27Y), at a light emission timing differing for visible light of any one of RGB, infrared light, and ultraviolet light, and detects the image data by the second CCD sensor 24 (24Y) at detection timings respectively synchronized with the light emissions of the third light emitting body 27 (27Y) (refer to visible reflection back, infrared reflection back, and ultraviolet reflection back in FIG. 8). As a result, the reflection image data for the visible light for the reverse side in the front and back direction of the bank note, the reflection image data for the infrared light for the reverse side in the front and back direction of the bank note, and the reflection image data for the ultraviolet light for the reverse side in the front and back direction of the bank note are obtained.

Furthermore, for the reflection image data for the visible light for the reverse side in the front and back direction of the bank note, the reflection image data for the infrared light for the reverse side in the front and back direction of the bank note, and the reflection image data for the ultraviolet light for the reverse side in the front and back direction of the bank note, the light emission timings and the detection timings all coincide for the transmission image data for the visible light for the front and back of the bank note, the transmission image data for the infrared light for the front and back of the bank note, the transmission image data for the ultraviolet light for the front and back of the bank note, the reflection image data for the visible light for one side in the front and back direction of the bank note, the reflection image data for the infrared light for the one side in the front and back direction of the bank note, and the reflection image data for the ultraviolet light for the one side in the front and back direction of the bank note. In the case where the detection timing of the image data of the first CCD sensor 24 (24X) and the detection timing of the image data of the second CCD sensor 24 (24Y) coincide, then preferably these coincide for the same associated wavelength regions (in FIG. 8 refer to the point where the visible transmission and the visible reflection back have the detection timings coincided, the point where the infrared transmission and the infrared reflection back have the detection timings coincided, and the point where the ultraviolet transmission and the ultraviolet reflection back have the detection timings coincided).

As described above, according to the image detector for bank notes 11 of the third embodiment, each of the first light emitting body 31 (31X), the second light emitting body 27 (27X), and the third light emitting body 27 (27Y), irradiate light of three different wavelength regions. Therefore discrimination accuracy can be further improved.

Moreover, each of the first light emitting body 31 (31X), the second light emitting body 27 (27X), and the third light emitting body 27 (27Y), irradiate light of visible light, infrared light and ultraviolet light. Therefore differences in associated image data can be made conspicuous, and comparability can be increased. Consequently, discrimination accuracy can be further improved.

Figure 9:
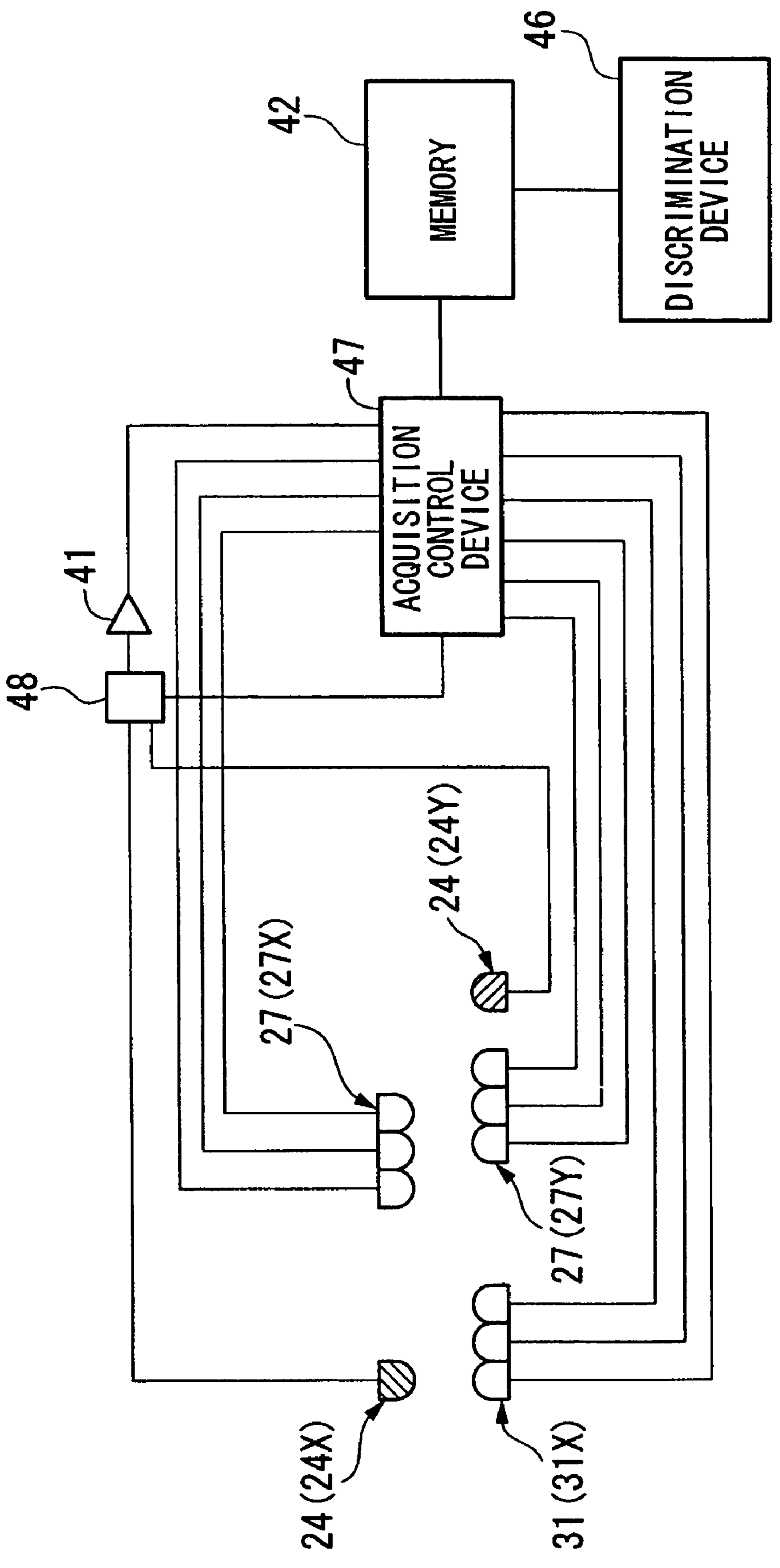
FIG. 9 is a block diagram of a control system illustrating an image detector for bank notes according to a fourth embodiment of the present invention.
Figure 10:
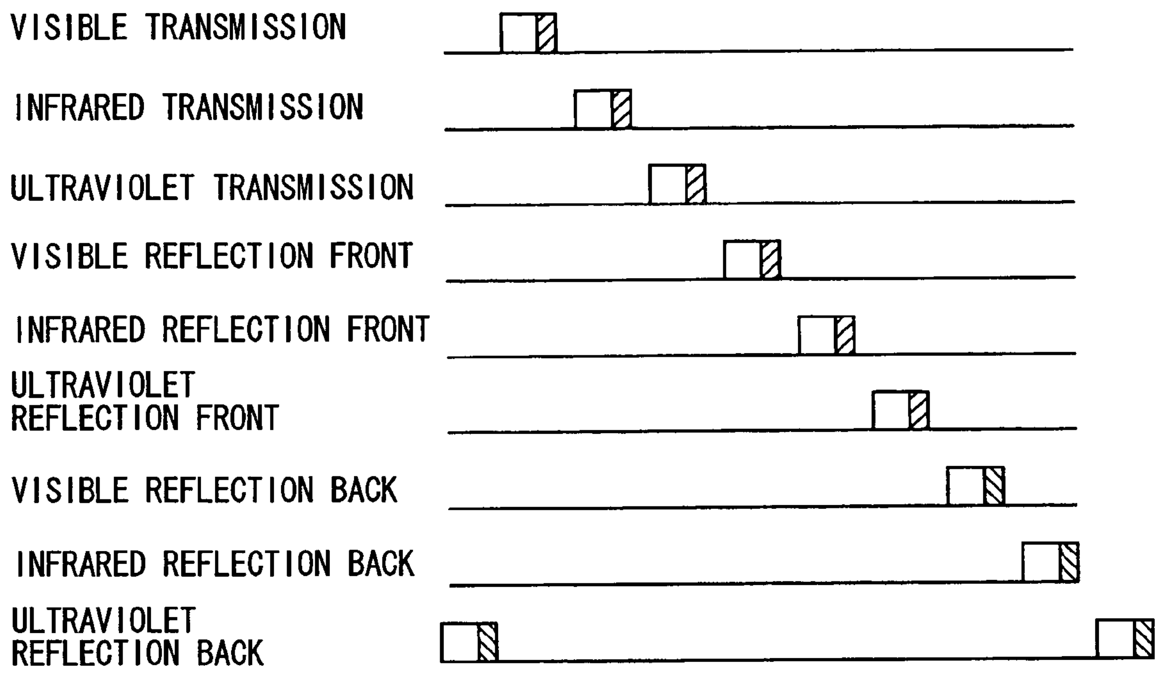
FIG. 10 is a timing chart of light emission and image detection in the image detector for bank notes according to the fourth embodiment of the present invention.

Next an image detector for bank notes according to a fourth embodiment of the present invention is described hereunder, with reference to FIG. 9 and FIG. 10, centered on the parts different to the third embodiment. Parts the same as for the third embodiment are denoted by the same reference symbols, and description is omitted.

In the third embodiment, the first acquisition control device 43 and the second acquisition control device 45 are used. However, in the fourth embodiment, as shown in FIG. 9, a single acquisition control device 47 is used. That is to say, the acquisition control device 47 of the fourth embodiment, only emits light of three different wavelength ranges from the first light emitting body 31 (31X), at respective different light emission timings, by for example drive of the LED elements 33A, 33B and 33C, and only emits light of three different wavelength ranges from the second light emitting body 27 (27X), at respective different light emission timings which are also different light emission timings to the first light emitting body 31 (31X), by for example drive of the LED elements 29A, 29B and 29C, and also only emits light of three different wavelength ranges from the third light emitting body 27 (27Y), at respective different light emission timings which are also different light emission timings to the first light emitting body 31 (31X) and the second light emitting body 27 (27X), by for example drive of the LED elements 29A, 29B and 29C.

Together with this, the acquisition control device 47 of the fourth embodiment, takes in to a first image memory region of the memory 42, six image datas detected by the first CCD sensor 24 (24X) at detection timings respectively synchronized with the light emissions of the first light emitting body 31 (31X) and the second light emitting body 27 (27X), and which are AD converted by the AD converter 41, and also takes in to a second image memory region of the memory 42, three image datas detected by the second CCD sensor 24 (24Y) at detection timings respectively synchronized with the light emissions of the third light emitting body 27 (27Y), and which are AD converted by the AD converter 41 via the multiplexer 48.

Here because the acquisition control device 47 is only one, the timing is controlled so that the detection timings of the image data of the first CCD sensor 24 (24X) and the detection timings of the image data of the second CCD sensor 24 (24Y) are all staggered.

More specifically, as shown in FIG. 10, (FIG. 10 shows the respective detection timings, the hatched sections being the image detection timing), the acquisition control device 47, emits light by the first light emitting body 31 (31X), at light emission timings respectively differing for visible light of any one of RGB, infrared light, and ultraviolet light, and detects the image data by the first CCD sensor 24 (24X) at detection timings respectively synchronized with the light emissions of the first light emitting body 31 (31X) (refer to visible transmission, infrared transmission and ultraviolet transmission in FIG. 10).

Furthermore, the acquisition control device 47, emits light by the second light emitting body 27 (27X), at a light emission timing differing for visible light of any one of RGB, infrared light, and ultraviolet, and at a light emission timing also different to all of the light emissions of the first light emitting body 31 (31X), and detects the image data by the first CCD sensor 24 (24X) at detection timings respectively synchronized with the light emissions of the second light emitting body 27 (27X) (refer to visible reflection front, infrared reflection front, and ultraviolet reflection front in FIG. 10). Consequently, the transmission image data for the visible light for the front and back of the bank note, the transmission image data for the infrared light for the front and back of the bank note, the transmission image data for the ultraviolet light for the front and back of the bank note, the reflection image data for the visible light for one side in the front and back direction of the bank note, the reflection image data for the infrared light for one side in the front and back direction of the bank note, and the reflection image data for the ultraviolet light for one side in the front and back direction of the bank note, are obtained.

Moreover, the acquisition control device 47 emits light by the third light emitting body 27 (27Y), at a light emission timing differing for visible light of any one of RGB, infrared light, ultraviolet light, and also at a light emission timing different to all of the light emissions of the first light emitting body 31 (31X), and the second light emitting body 27 (27X), and detects the image data by the second CCD sensor 24 (24Y) at detection timings respectively synchronized with the light emissions of the third light emitting body 27 (27Y) (refer to visible reflection back, infrared reflection back, and ultraviolet reflection back in FIG. 10). As a result, the reflection image data for the visible light for the reverse side in the front and back direction of the bank note, the reflection image data for the infrared light for the reverse side in the front and back direction of the bank note, and the reflection image data for the ultraviolet light for the reverse side in the front and back direction of the bank note, are obtained.

As described above, according to the image detector for bank notes 11 of the fourth embodiment, the single acquisition control device 47 emits light of three different wavelength ranges from the first light emitting body 31 (31X), at respective different light emission timings, and emits light of three different wavelength ranges from the second light emitting body 27 (27X), at respective different light emission timings which are also different light emission timings to the first light emitting body 31 (31X), and also emits light of three different wavelength ranges from the third light emitting device 27 (27Y) at respective different light emission timings which are also different light emission timings to the first light emitting device 31 (31X) and the second light emitting device 27 (27X), and together with this, takes in to an image memory region, six image datas detected by the first CCD sensor 24 (24X) at detection timings respectively synchronized with the light emissions of the first light emitting body 31 (31X) and the second light emitting body 27 (27X), and three image datas detected by the second CCD sensor 24 (24Y) at detection timings respectively synchronized with the light emissions of the third light emitting body 27 (27Y). In this manner, one acquisition control device 47 is sufficient for the first CCD sensor 24 (24X) and the second CCD sensor 24 (24Y). Consequently cost can be further reduced.

As described above, according to the first aspect of the present invention, when light is irradiated by the first light emitting device towards the bank note on the bank note transportation path, the first image detection sensor arranged facing the first light emitting device with a bank note transportation path therebetween, detects the light transmitted through the bank note, namely the front and back transmission image. Furthermore, when the second light emitting device arranged on the same side of the bank note transmission path as the first image detection sensor emits light towards the bank note on the bank note transportation path, the first image detection sensor detects the reflected light, namely the reflection image for one side in the front and back direction. Moreover, when the third light emitting device positioned on the same side of the bank note transportation path as the second image detection sensor which is arranged on the opposite side of to the first image detection sensor, irradiates light towards the bank note on the bank note transportation path, the second image detection sensor detects the reflected light, namely the reflection image for the reverse side in the front and back direction. As a result, the image on one side in the front and back direction of the bank note, the image on the other side in the front and back direction of the bank note, and the transmission image for the front and back of the bank note can be detected. Furthermore, since the first light emitting device, the second light emitting device, and the third light emitting device each irradiate light of a plurality of different wavelength regions, then for each of; the image for one side in the front and back direction of the bank note, the image for the reverse side in the front and back direction of the bank note, and the transmission image for the front and back of the bank note, the images for when light of the different wavelength regions is irradiated can be detected. As a result, discrimination accuracy can be increased. Furthermore, for the image detection sensor, just two is sufficient, namely the first image detection sensor and the second image detection sensor. Consequently, cost can be reduced.

According to the second aspect of the present invention, the first acquisition control device emits light of a plurality of different wavelength ranges from the first light emitting device at respective different timings, and emits light of a plurality of different wavelength ranges from the second light emitting device at respective different timings which are also different timings to the first light emitting device, and detects image data by the first image detection sensor respectively synchronized with the light emissions of the first light emitting device and the second light emitting device, and takes in to the first image memory region, a plurality of image data detected by this first image detection sensor. On the other hand, the second acquisition control device emits light of a plurality of different wavelength ranges from the third light emitting device at respective different timings, and detects image data by the second image detection sensor respectively synchronized with the light emissions of the third light emitting device, and takes in to the second image memory region, a plurality of image data detected by the second image detection sensor. Since in this manner, the first acquisition control device is provided for the first image detection sensor, and the second acquisition control device is provided for the second image detection sensor, the detection timing for the image data of the first image detection sensor can be overlapped with the detection timing for the image data of the second image detection sensor. As a result, even more data can be detected for bank notes moving at the same transportation speed. Consequently discrimination accuracy can be further increased.

According to the third aspect of the present invention, since the detection timing for the image data of the first image detection sensor can be overlapped with the detection timing for the image of the second image detection sensor, even more data can be detected for bank notes moving at the same transportation speed. Consequently discrimination accuracy can be further increased.

According to the fourth aspect of the present invention, the single acquisition control device emits light of a plurality of different wavelength ranges from the first light emitting device at respective different timings, and emits light of a plurality of different wavelength ranges from the second light emitting device at respective different timings which are also different timings to the first light emitting device, and also emits light of a plurality of different wavelength ranges from the third light emitting device at respective different timings which are also different timings to the first light emitting device and the second light emitting device, and takes in to the image memory region, a plurality of image data detected by the first image detection sensor respectively synchronized with the light emissions of the first light emitting device and the second light emitting device, and a plurality of image data detected by the second image detection sensor, respectively synchronized with the light emissions of the third light emitting device. In this manner, one acquisition control device is sufficient for the first image detection sensor and the second image detection sensor. Consequently cost can be further reduced.

According to the fifth aspect of the present invention, because the first light emitting device, the second light emitting device, and the third light emitting device each irradiate light of two different wavelengths regions, discrimination accuracy can be improved.

According to the sixth aspect of the present invention, because the first light emitting device, the second light emitting device, and the third light emitting device each irradiate any two lights of visible light, infrared light, and ultraviolet light, differences in associated image data can be made conspicuous. Consequently discrimination accuracy can be improved.

According to the seventh aspect of the present invention, because the first light emitting device, the second light emitting device, and the third light emitting device each irradiate lights of three different wavelength regions, discrimination accuracy can be further improved.

According to the eighth aspect of the present invention, because the first light emitting device, the second light emitting device, and the third light emitting device each irradiate visible light, infrared light and ultraviolet light, differences in associated image data can be made conspicuous and comparability can be increased. Consequently discrimination accuracy can be further improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed is:

1. An image detector for bank notes comprising:

a first image detection sensor;

a first light emitting device provided on an opposite side of a bank note transportation path to said first image detection sensor, said first light emitting device emitting first light of a plurality of different wavelengths towards a bank note transported on said bank note transportation path, and said first image detection sensor detecting transmitted light that is the first light transmitted through said bank note;

a second light emitting device provided on the same side of said bank note transportation path as said first image detection sensor, said second light emitting device emitting second light of a plurality of different wavelengths towards a first face of a bank note transported on said bank note transportation path, and said first image detection sensor detecting first reflected light that is the second light reflected from the first face of said bank note;

a second image detection sensor provided on the opposite side of said bank note transportation path to said first image detection sensor; and a third light emitting device provided on the same side of said bank note transportation path as said second image detection sensor, said third light emitting device emitting third light of a plurality of different wavelengths towards a second face, opposed to the first face, of said bank note transported on said bank note transportation path, and said second image detection sensor detecting second reflected light that is the third light reflected from the second face of said bank note.

2. An image detector for bank notes according to claim 1, further comprising:

a first acquisition control device which has said first light emitting device emits the first light of a plurality of the different wavelengths at respective different timings, and has said second light emitting device emit the second light of a plurality of the different wavelengths at respective different timings which are also different timings to said first light emitting device, and captures in a first image memory region, a plurality of image data detected by said first image detection sensor respectively synchronized with the light emissions of said first light emitting device and said second light emitting device; and a second acquisition control device which has said third light emitting device emit the third light of a plurality of the different wavelengths at respective different timings, and captures in a second image memory region, a plurality of image data detected by said second image detection sensor respectively synchronized with the light emissions of said third light emitting device.

3. An image detector for bank notes according to claim 2, wherein said first acquisition control device and second acquisition control device overlap the detection timing of the image of said first image detection sensor with the detection timing of the image of said second image detection sensor.

4. An image detector for bank notes according to claim 1, further comprising:

a single acquisition control device which has said first light emitting device emit the first light of a plurality of the different wavelengths at respective different timings, and has said second light emitting device emit the second light of a plurality of the different wavelengths at respective different timings which are also different timings to said first light emitting device, and also has said third light emitting device emit the third light of a plurality of the different wavelengths at respective different timings which are also different timings to said first light emitting device and said second light emitting device, and captures in an image memory region, a plurality of image data detected by said first image detection sensor respectively synchronized with the light emissions of said first light emitting device and said second light emitting device, and a plurality of image data detected by said second image detection sensor, respectively synchronized with the light emissions of said third light emitting device.

5. An image detector for bank notes according to claim 1, wherein said first light emitting device, said second light emitting device, and said third light emitting device each emits light of two different wavelengths.

6. An image detector for bank notes according to claim 5, wherein said first light emitting device, said second light emitting device, and said third light emitting device each emits any two of visible light, infrared light, and ultraviolet light.

7. An image detector for bank notes according to claim 1, wherein said first light emitting device, said second light emitting device, and said third light emitting device each emits light of three different wavelengths.

8. An image detector for bank notes according to claim 7, wherein said first light emitting device, said second light emitting device, and said third light emitting device each emits visible light, infrared light and ultraviolet light.

9. A method of image detection for bank notes, comprising:

providing a first light emitting device on an opposite side of a bank note transportation path to a first image detection sensor, wherein the first light emitting device emits first light of a plurality of different wavelengths towards a bank note transported on the bank note transportation path, and the first image detection sensor detects transmitted light that is the first light transmitted through the bank note;

providing a second light emitting device on the same side of the bank note transportation path as the first image detection sensor, wherein the second light emitting device emits second light of a plurality of different wavelengths towards a first face of a bank note transported on the bank note transportation path, and the first image detection sensor detects first reflected light that is the second light reflected from the first face of the bank note;

locating a second image detection sensor on the an opposite side of the bank note transportation path to the first image detection sensor; and providing a third light emitting device on the same side of the bank note transportation path as the second image detection sensor, wherein the third light emitting device emits third light of a plurality of different wavelengths towards a second face, opposed to the first face, of the bank note transported on the bank note transportation path, wherein the second image detection sensor detects second reflected light that is the third light reflected from the second face of the bank note.

10. The method according to claim 9, further comprising:

emitting the first light of a plurality of the different wavelengths from the first light emitting device at respective different timings;

emitting the second light of a plurality of the different wavelengths from the second light emitting device at respective different timings which are also different timings to the first light emitting device;

receiving a plurality of image data detected by the first image detection sensor, respectively synchronized with the light emissions of the first light emitting device and the second light emitting device;

emitting the third light of a plurality of the different wavelengths from the third light emitting device at respective different timings; and receiving a plurality of image data detected by the second image detection sensor respectively synchronized with the light emissions of the third light emitting device.

11. The method according to claim 9, further comprising:

emitting the first light of a plurality of the different wavelengths from the first light emitting device at respective different timings;

emitting the second light of a plurality of the different wavelengths from the second light emitting device at respective different timings which are also different timings to the first light emitting device;

emitting the third light of a plurality of the different wavelengths from the third light emitting device at respective different timings which are also different timings to the first light emitting device and the second light emitting device; and receiving a plurality of image data detected by the first image detection sensor respectively synchronized with the light emissions of the first light emitting device and the second light emitting device, and a plurality of image data detected by the second image detection sensor, respectively synchronized with the light emissions of the third light emitting device.

12. The method according to claim 9, wherein the first light emitting device, the second light emitting device, and the third light emitting device each emits light of two different wavelengths.

13. The method according to claim 9, wherein the first light emitting device, the second light emitting device, and the third light emitting device each emits any two of visible light, infrared light, and ultraviolet light.

14. The method according to claim 9, wherein the first light emitting device, the second light emitting device, and the third light emitting device each emits light of three different wavelengths.

15. The method according to claim 9, wherein the first light emitting device, the second light emitting device, and the third light emitting device each emits visible light, infrared light and ultraviolet light.

16. An image detecting device for bank notes comprising:

first light emitting means, which are a provided on an opposite side of a bank note transportation path to first image detection means, for emitting first light of a plurality of different wavelengths towards a bank note transported on the bank note transportation path, and the first image detection sensor detecting transmitted light that is the first light transmitted through the bank note, second light emitting means, which are provided on the same side of the bank note transportation path as the first image detection means, for emitting second light of a plurality of different wavelengths towards a first face of a bank note transported on the bank note transportation path, and the first image detection means detecting first reflected light that is the second light reflected from the first face of the bank note;

second image detection means provided on the opposite side of the bank note transportation path to the first image detection means; and third light emitting means provided on the same side of the bank note transportation path as the second image detection means, for emitting third light of a plurality of different wavelengths towards a second face, opposed to the first face, of the bank note transported on the bank note transportation path, and the second image detection means detecting second reflected light that is the third light reflected from the second face of the bank note.

17. The device according to claim 16, further comprising:

means for having the first light emitting means emit the first light of a plurality of the different wavelengths at respective different timings;

means for having the second light emitting means emit the second light of a plurality of the different wavelengths at respective different timings which are also different timings to the first light emitting means;

means for receiving a plurality of image data detected by the first image detection means, respectively synchronized with the light emissions of the first light emitting means and the second light emitting means;

means for having the third light emitting means emit the third light of a plurality of the different wavelengths at respective different timings; and means for receiving a plurality of image data detected by the second image detection sensor, respectively synchronized with the light emissions of the third light emitting means.

18. The device according to claim 16, further comprising:

means for having the first light emitting means emit the first light of a plurality of the different wavelengths at respective different timings;

means for having the second light emitting means emit emitting the second light of a plurality of the different wavelengths at respective different timings which are also different timings to the first light emitting means;

means for having the third light emitting means emit the third light of a plurality of the different wavelengths at respective different timings which are also different timings to the first light emitting means and the second light emitting means; and means for receiving a plurality of image data detected by the first image detection sensor respectively synchronized with the light emissions of the first light emitting means and the second light emitting means, and a plurality of image data detected by the second image detection sensor, respectively synchronized with the light emissions of the third light emitting means.

19. The device according to claim 16, wherein the first light emitting means, the second light emitting means, and the third light emitting means each emits light of two different wavelengths.

20. The device according to claim 16, wherein the first light emitting means, the second light emitting means, and the third light emitting means each emits any two of visible light, infrared light, and ultraviolet light.

21. An image detector for bank notes according to claim 1, further comprising:

a first detector unit including said first image detection sensor, said second light emitting device, and a fourth light emitting device emitting fourth light; and a second detector unit including said second image detection sensor, said third light emitting device, and said first light emitting device;

wherein said first image detection sensor, said second light emitting device, and said fourth light emitting device of said first detector unit are substantially of the same construction as said second image detection sensor, said third light emitting device, and said first light emitting device of said second detector unit, respectively, said first light emitting device and said second light emitting device respectively emit the first light and the second light towards a first detection area, said third light emitting device and said fourth light emitting device respectively emit the third light and the fourth light towards a second detection area located in a different location from the first detection area, and said second detector unit is provided on an opposite side of said bank note transportation path to said first detector unit.

22. An image detector for bank notes according to claim 21, wherein a distance from one end in a bank note transportation direction of said bank note transportation path to the first detection area, and a distance from the other end in the bank note transportation direction of said bank note transportation path to the second detection area, are equal.

* * * * *